United States Patent
Shan

(10) Patent No.: US 7,765,122 B2
(45) Date of Patent: Jul. 27, 2010

(54) FORECASTING BASED ON A COLLECTION OF DATA INCLUDING AN INITIAL COLLECTION AND ESTIMATED ADDITIONAL DATA VALUES

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 11/879,924

(22) Filed: Jul. 19, 2007

(65) Prior Publication Data

US 2009/0024444 A1    Jan. 22, 2009

(51) Int. Cl.
    *G06F 17/00*    (2006.01)
(52) U.S. Cl. ............................................ 705/10
(58) Field of Classification Search ................ 705/10
    See application file for complete search history.

(56) References Cited

U.S. PATENT DOCUMENTS

| | | | |
|---|---|---|---|
| 5,676,690 | A | 10/1997 | Noren |
| 5,893,069 | A | 4/1999 | White |
| 6,532,449 | B1 * | 3/2003 | Goertzel et al. ........... 705/36 R |
| 7,111,007 | B2 | 9/2006 | Thier |
| 7,369,961 | B2 | 5/2008 | Castelli |
| 2002/0169658 | A1 | 11/2002 | Adler |
| 2003/0018501 | A1 | 1/2003 | Shan |
| 2005/0256759 | A1 | 11/2005 | Acharya |
| 2006/0116830 | A1 | 6/2006 | Shan |
| 2008/0221974 | A1 * | 9/2008 | Gilgur et al. ................. 705/10 |
| 2009/0024407 | A1 | 1/2009 | Shan |
| 2009/0024427 | A1 | 1/2009 | Shan |

OTHER PUBLICATIONS

Smith et al; Cost estimation predictive modeling; regression versus neural network; Wntr, 1997; Engineering Economist, v42, n2, p. 137(25) (dialogclassic copy).*
P.S. Kalekar, "Time Series Forecasting Using Holt-Winters Exponential Smoothing," pp. 1-13 (Dec. 6, 2004).
Ouwehand, Pim; Forecasting with group seasonality; Technische Universiteit Eindhoven; v6801C; 2006, abstract only (2 pages).
Palma et al; Efficient estimation of Seasonal Long-Range-Dependent Processes; Nov. 2005; Journal of Time Series Analysis, v26n6, pp. 863-892; dialog abstract only (1 page).
Kifer et al., Detecting Change in Data Streams, Proceedings of the 30th VLDB Conference, Toronto, Canada 2004, pp. 180-191.
Shan, Jerry Z., U.S. Appl. No. 11/273,696 entitled "Detecting Data Change Based on Adjusted Data Values" filed Nov. 14, 2005 (32 pages).

* cited by examiner

*Primary Examiner*—Thomas Dixon

(57) ABSTRACT

To forecast data, an initial collection of data having a first length is received. In response to determining that the first length of the initial collection of data is insufficient for performing forecasting using a forecasting algorithm, an order of the initial collection of data is reversed to provide a reversed collection of data. Forecasting is applied on the reversed collection of data to estimate additional data values to combine with the initial collection of data to provide a second collection of data having a second length greater than the first length. The forecasting algorithm is applied on the second collection of data.

20 Claims, 4 Drawing Sheets

FORECASTING BASED ON A COLLECTION OF DATA INCLUDING AN INITIAL COLLECTION AND ESTIMATED ADDITIONAL DATA VALUES

BACKGROUND

In performing analysis of various aspects of an enterprise (e.g., a business, an educational organization, or a government agency), data can be received in the form of a time series, which is a collection of data points over time. Based on the received time series data, analysts can perform forecasting by applying forecasting algorithms on the time series data to produce future forecast data points. A widely used forecasting algorithm is the Holt-Winters forecasting algorithm, also known as the triple exponential smoothing algorithm.

An issue associated with using forecasting algorithms, such as the Holt-Winters algorithm, is that there has to be a certain number of data points in a time series before the forecasting algorithm can be applied. However, in many cases, a time series having the proper length is not available to enable application of the forecasting algorithm. In one example, historical sales data for products manufactured by a company may not have been collected and stored on time. In such situations, many conventional forecasting algorithms cannot be employed to perform forecasting.

BRIEF DESCRIPTION OF THE DRAWINGS

Some embodiments of the invention are described with respect to the following figures.

DETAILED DESCRIPTION

Figure 1:
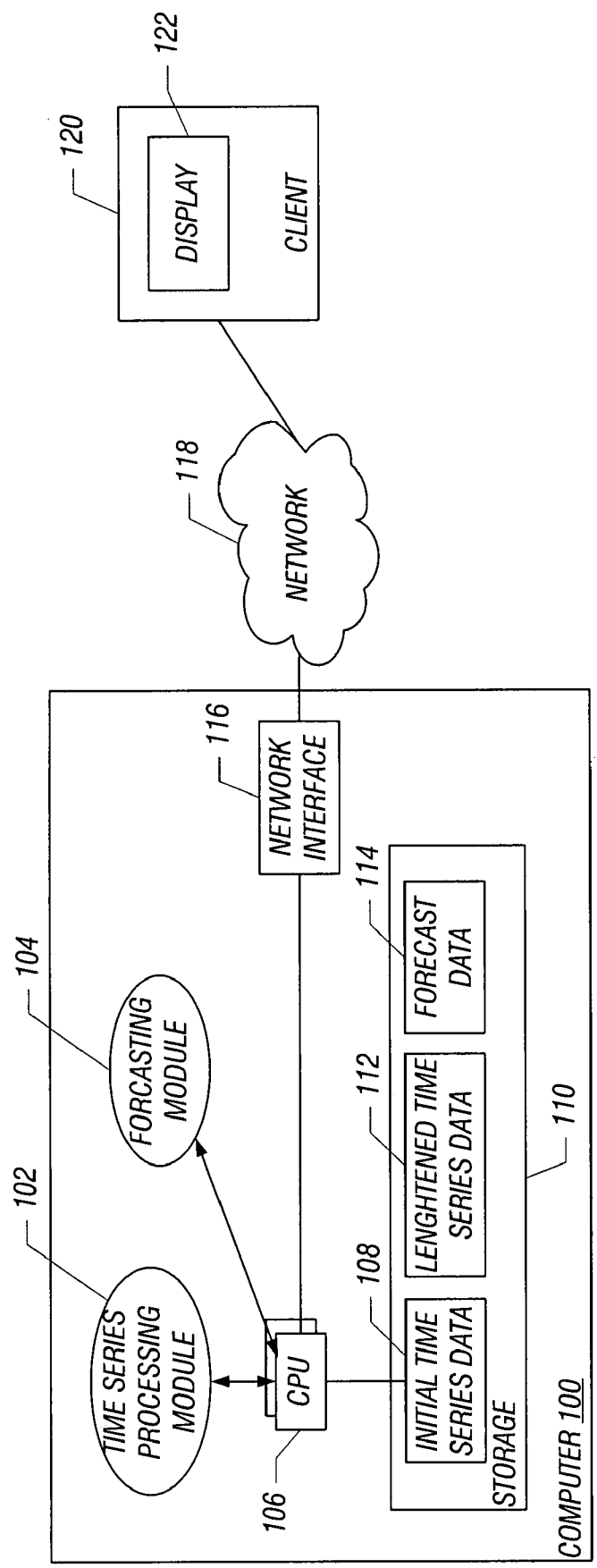
FIG. 1 is a block diagram of an example arrangement that includes a computer that incorporates software executable to perform tasks according to an embodiment.

In general, a technique according to an embodiment is able to determine whether initial time series data having a first length is sufficient for performing forecasting using a forecasting algorithm. In response to determining that the first length of the initial time series data is insufficient to perform forecasting using the forecasting algorithm, additional data points are estimated or created to combine with the initial time series data to provide second (lengthened) time series data having a second length that is greater than the first length. The forecasting algorithm is then applied on the second time series data. "Time series data" refers to a collection of data values over a sequence of successive time points. Forecasting based on the time series data refers to producing predicted data values using the data values in the time series data.

In some embodiments, the estimating or creation of the additional data points is according to a reverse forecasting technique that involves reversing a time order of the initial time series data and then applying forecasting, using a forecasting algorithm, on the reversed time series data to produce forecast data for time points that are earlier than the earliest time point of the initial time series data. In other words, the forecast that is based on the reversed time series data forecasts into the past, rather than into the future. The forecast data for these past time points are the estimated additional data points that are combined with the initial time series data to produce the second time series data having the second length, such that the forecasting algorithm can be applied to forecast future data. In another embodiment, instead of using the reverse forecasting technique, if it is determined that the initial time series is of insufficient length to apply the forecasting algorithm, then additional data for time points prior to a beginning time point of the initial time series can be constructed (predicted) by transforming data values from certain time points in the initial time series. The certain time points can be selected in such a way that one can use them to construct the values of the missing part of the initial time series. For example, the missing data values at the missing time points can be constructed from the corresponding time points in the initial time series (e.g., a missing data value for January in last year would be transformed from an existing January time point this year in the initial time series, a missing data value for February last year would be transformed from an existing February time point this year in the initial time series, and so forth). The data transformation can be performed by applying a duplicating function if there is no trend effect, or a growth or decay function based on year over year (or other period) change rate if trend effect is present.

A benefit of some embodiments is the ability to extend historical time series data to a proper length (by estimating past data values) to enable application of a forecasting algorithm. As a result, even if historical time series data is of insufficient length, techniques according to some embodiments enable an enterprise (e.g., business, educational organization, or government agency) to use a forecasting algorithm to perform forecasting. Time series data of insufficient length for applying a forecasting algorithm can result from various causes (e.g., interruptions to business operation, products having short life cycles, businesses or business divisions that are newly formed, and so forth). An enterprise can use forecasting for planning purposes, to identify characteristics (e.g., trends, seasonality) in existing time series data, and/or for other purposes.

In some embodiments, the forecasting algorithm that is used is a Holt-Winters forecasting algorithm, also referred to as a triple exponential smoothing algorithm. In other embodiments, other types of forecasting algorithms can be employed, such as the seasonal ARIMA (autoregressive integrated moving average model) or other forecasting algorithms. Examples of data values that can be included in a time series include sales, revenue, costs, profit, performance parameters relating to networks and servers, and other types of data values.

The Holt-Winters forecasting algorithm is able to account for three effects in the time dimension: local level effect, trend effect, and seasonality effect. The local level effect refers to data fluctuation around a reasonably stable mean in a local time window (e.g., three-month window, one-year window, etc.), assuming that there is no significant trend or consistent pattern of growth in the time window. The trend effect refers to some pattern of growth (or contraction) of data values in the time series data. The seasonality effect refers to the tendency of time series data to exhibit behavior that repeats itself every period. As an example of a seasonality effect, retail stores may have sales that peak during the holiday season in each year.

To perform Holt-Winters forecasting, time series data has to have a certain length, which in some examples is three times the underlying cycle length for seasonality in the time series data. Thus, for example, if the cycle length of measurements in the time series data is 12 months, then the amount of time series data that has to be present to allow for application of the Holt-Winters forecasting algorithm is 36 months. In many cases, however, existing historical time series data may not be of sufficient length. Techniques according to some embodiments can therefore be used to extend the length of the time series data to allow for application of the Holt-Winters forecasting algorithm.

Reference has been made to applying a forecasting algorithm to a time series of data. In further embodiments, techniques according to some embodiments can also be applied to other collections of data that are collected for other attributes (other than time), such as product type, geographic location, enterprise department, and so forth. These different collections of data can also be of insufficient length for application of a forecasting algorithm. For such a collection of data, to estimate additional data points to allow the collection of data to be lengthened, an order of the collection of data can be reversed and forecasting can then be applied on the reversed collection of data. The estimated additional data points are then combined with the initial collection of data to produce a lengthened collection of data on which the forecasting algorithm can be applied.

In the ensuing discussion, reference is made to the Holt-Winters forecasting algorithm in time series data. However, techniques according to some embodiments can also be applied with other types of forecasting algorithms, and with other types of collections of data.

FIG. 1 illustrates an example arrangement that includes a computer 100 that includes a time series processing module 102 and a forecasting module 104, which can be software modules executable on one or more central processing units (CPUs) 106. The time series processing module 102 is able to retrieve initial time series data 108 (stored in a storage 110) to determine whether the initial time series data has a sufficient length to enable the application of a forecasting algorithm (e.g., Holt-Winters forecasting algorithm) on the initial time series data 108 by the forecasting module 104. If the time series processing module 102 determines that the initial time series data 108 does not have sufficient length, then the time series processing module 102 processes the initial time series data to produce estimated data values for past time points, such as time points prior to the earliest time point for the initial time series data 108. The predicted data values are combined with the initial time series data 108 to produce new or lengthened time series data 112, which can also be stored in the storage 110. The lengthened time series data 112 has a time length that is sufficient to enable application of the forecasting algorithm on the lengthened time series data 112.

Based on application of the forecasting algorithm on the lengthened time series data 112, the forecasting module 104 produces future forecast data 114. The forecast data 114 can be stored in the storage 110 for later retrieval, or alternatively, the forecast data 114 can be transmitted through a network interface 116 of the computer 100 over a data network 118 to a remote client computer 120.

Examples of the remote client computer 120 include a notebook computer, a personal digital assistant (PDA), a mobile telephone, a desktop computer, and so forth. The client computer 120 has a display 122 or other output device to allow for display (or other presentation) of the forecast data 114. Note that multiple client computers 120 can be connected to the network 118 to receive forecast data 114 from the computer 100, which can be a server computer accessible by multiple clients.

Figure 2A:
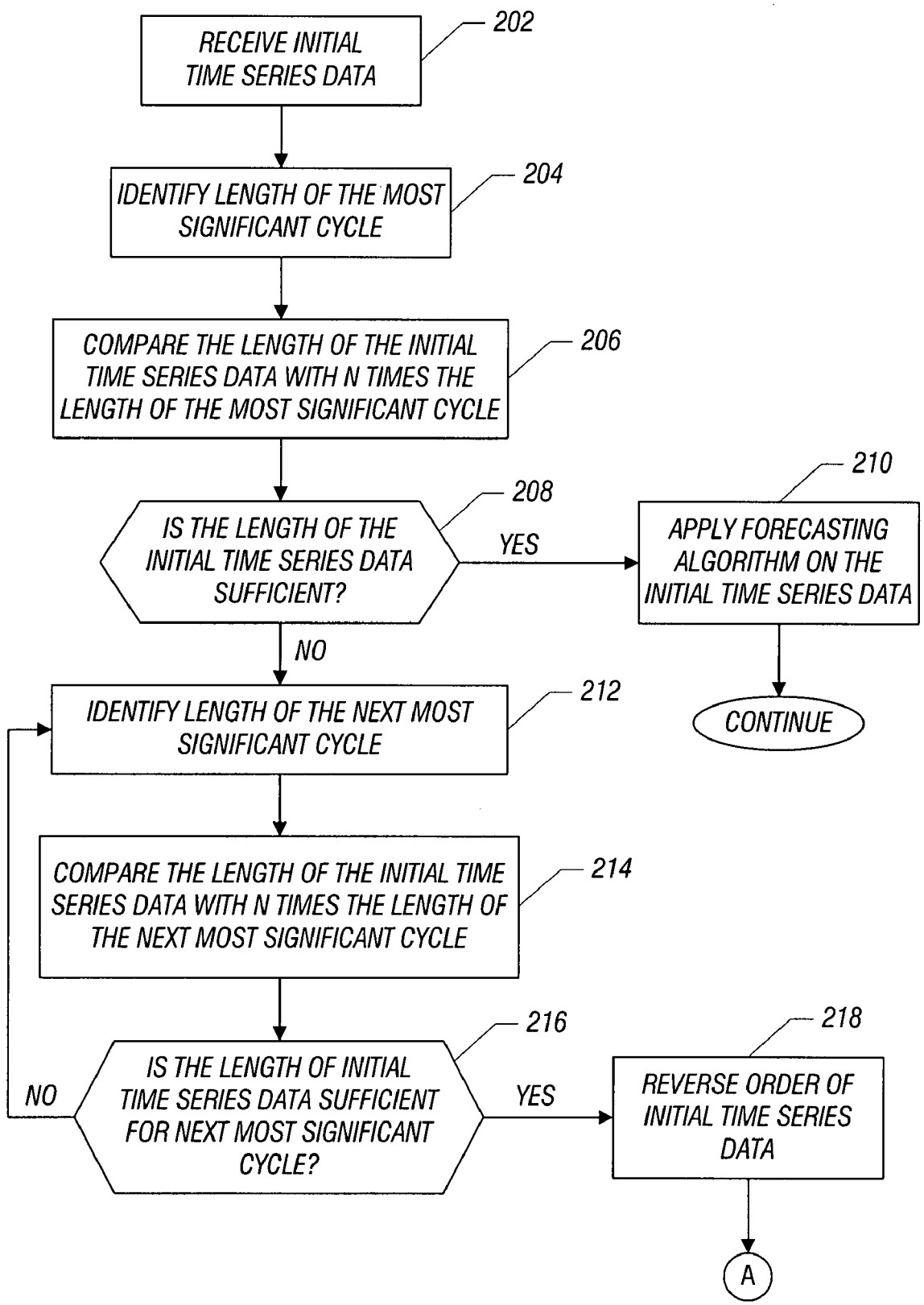
FIGS. 2A-2B depict a flow diagram of a process of performing forecasting based on time series data, according to an embodiment.
Figure 2B:
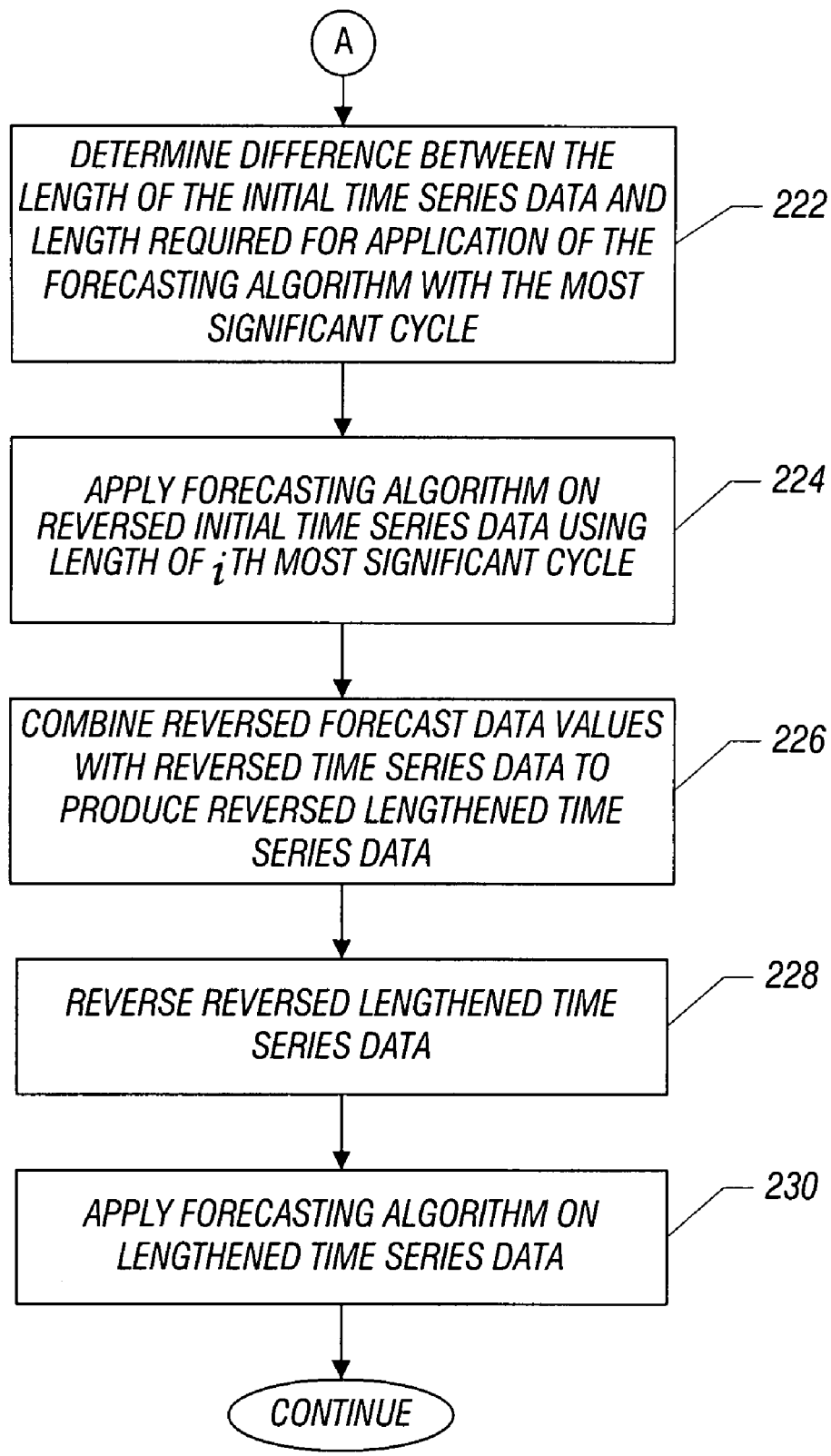

FIGS. 2A-2B depict a flow diagram of a process according to an embodiment, which can be performed by the time series processing module 102 and/or forecasting module 104 of FIG. 1. The time series processing module 102 receives (at 202) the initial time series data 108. The initial time series data 108 can be received from the storage 110, or from a remote storage over the network 118.

The time series processing module 102 analyzes the initial time series data 108 to identify (at 204) the length of the most significant cycle. As discussed above, the time series data can exhibit a seasonality effect, which refers to a time-dependent pattern in the time series data, where the pattern tends to repeat every season (or cycle) of a certain length (referred to as the "cycle length"). The pattern does not have to be periodic, and in fact, may occur at different time intervals and different cycles. One example seasonality effect is the year-end seasonality effect, where strong sales tend to occur near the end of the year. Another example of seasonality effect is a quarterly seasonality effect that accounts for variations in the three months of each quarter of the year. The cycle length corresponding to the end-of-year seasonality effect is one year (or twelve months). Cycle lengths for other example seasonality effects can be in terms of seconds, minutes, hours, days, weeks, quarters, and so forth.

A time series data can have one or more cycle lengths corresponding to one or more seasonality effects in the time series data. For example, time series data can exhibit both an annual seasonality effect and a quarterly seasonality effect. The cycle length can include a "most significant" cycle length, which is the cycle length associated with the seasonality effect having the largest cycle. In the above example, the cycle length of the annual seasonality effect (twelve months) is the most significant cycle length, while the cycle length associated with the quarterly cycle effect (three months) is the next most significant cycle length. One approach to identifying the length of the most significant cycle is described in U.S. patent application Ser. No. 7,200,505. Another approach for identifying the length of the most significant cycle is described in U.S. Application Publication No. 2009/0024427, entitled "Analyzing Time Series Data that Exhibits Seasonal Effects," filed Jul. 19, 2007.

The most significant cycle can be an annual cycle, a quarterly cycle, a monthly cycle, a bi-annual cycle, and so forth. If the most significant cycle is determined to be an annual cycle, then the length of the most significant cycle is 12 (expressed in terms of months). In the ensuing discussion, reference is made to expressing time series and lengths of time series in terms of months. However, in other implementations, the length of time series or of cycles within time series can be expressed in other units, such as days, weeks, hours, seconds, and so forth.

Next, the time series processing module 102 compares (at 206) the length of the initial time series data with N times the length of the most significant cycle, where N is a number (integer or real number) that is selected based on the type of forecasting algorithm used. For example, if the forecasting algorithm is the Holt-Winters (or triple exponential smoothing) algorithm, then N=3. In other words, N times the length of the most significant cycle is the length of the time series that has to be provided to enable the forecasting algorithm to properly apply forecasting on the time series data.

The time series processing module 102 next determines (at 208) if the length of the initial time series data is sufficient (based on the comparing at 206). If the length of the initial time series data is sufficient (the length of the initial time series data is at least N times the most significant cycle length), then the forecasting module 104 is invoked to apply (at 210) the forecasting algorithm on the initial time series data.

However, if the length of the initial time series data is less than N times the length of the most significant cycle, then the time series processing module 102 identifies (at 212) the length of the next most significant cycle. At this point, the next most significant cycle is the second most significant cycle, which has a length that is smaller than the most significant cycle identified at 204. The length of the initial time series data is then compared (at 214) by the time series processing module 102 with N times the length of the next most significant cycle.

The time series processing module 102 then determines (at 216) if the length of the initial time series data is sufficient for the next most significant cycle. If not, the process returns to task 212 to repeat for the next most significant cycle (which at this point would be the third most significant cycle). The loop of 212, 214, and 216 continues until an $i^{th}$ next most significant cycle is found for which the length of the initial time series data is sufficient for applying the forecasting algorithm.

Once such an $i^{th}$ most significant cycle is identified, the order of the initial time series data is reversed (at 218) by the time series processing module.

Next, the difference between the length of the initial time series data and the length required for application of the Holt-Winters forecasting algorithm with the most significant cycle is determined (at 222), with this difference represented by $\Delta$ months.

The forecasting module 104 is then invoked to apply (at 224) the forecasting algorithm on the reversed initial time series data using the cycle length of the $i^{th}$ most significant cycle. For example, if the most significant cycle length is 12 months, then the second most significant cycle length can be three months (to represent a cycle of a quarter). To enable application of the Holt-Winters forecasting algorithm on the reversed initial time series data, for the second most significant cycle length of three months, the reversed initial time series data should have a length of at least N×3 or nine months (in one example). In this case, the frequency of the Holt-Winters forecasting algorithm is set at ⅓, to correspond to the three-month second most significant cycle length. With the frequency (seasonality) parameter of the Holt-Winters algorithm specified to be ⅓, the Holt-Winters algorithm is applied by the forecasting module 104 on the reverse initial time series data. The forecast applied at 224 is a forecast based on the reversed initial time series data to forecast into the past. The forecast into the past produces data values for the $\Delta$ months prior to the beginning time point of the initial time series data. Thus, assuming that the initial time series data begins at time point $t_0$, then the $\Delta$ months for which the reverse forecast is performed include the $\Delta$ time points just prior to time $t_0$. The reversed forecast data values are combined (at 226) by the time series processing module 102 with the reversed time series data to produce a reversed lengthened time series data (which is the reverse of the lengthened time series data 112 of FIG. 1).

The time series processing module 102 then reverses (at 228) the reversed lengthened time series data to produce the lengthened time series data 112. The lengthened time series data 112 has a length that is sufficient to apply the Holt-Winters forecasting algorithm with the most significant cycle length. The forecasting module 104 is then invoked to apply (at 230) the Holt-Winters forecasting algorithm on the lengthened time series data. The forecast can be any month-ahead forecast, up to the limits specified by the Holt-Winters algorithm.

Figure 3:
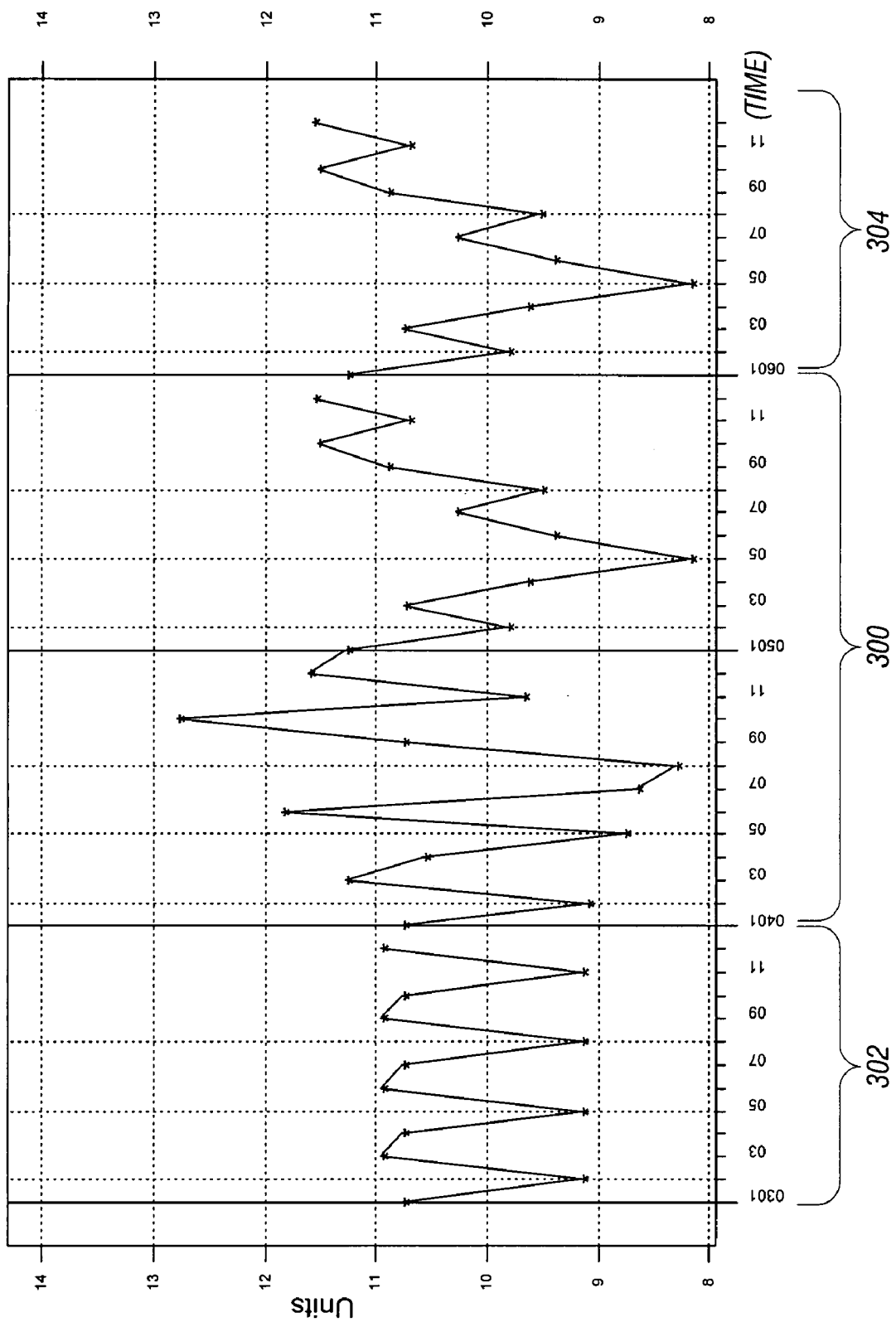
FIG. 3 is a graph that illustrates an example of estimating historical data points for time series data to enable application of a forecasting algorithm to produce forecast data, according to an example embodiment.

FIG. 3 is an example graph that has a horizontal time axis (expressed in terms of months) and a vertical axis that is in terms of units (where units can be sales dollar amounts, profit numbers, cost numbers, network or computer performance numbers, etc.). The graph of FIG. 3 depicts a time series that has three segments: an initial time series data segment 300 (which corresponds to the initial time series data 108 of FIG. 1); a reversed forecast data segment 302 (which corresponds to the reverse forecast data computed at 224 in FIG. 2B by application of the Holt-Winters forecasting algorithm on the reversed initial time series data with frequency corresponding to the $i^{th}$ most significant cycle length); and a future forecast data segment 304 (which is based on application of the Holt-Winters forecasting algorithm on the lengthened time series data 112 made up of segments 300 and 302 in FIG. 3). Note that the future forecast data segment 304 is based on application of the Holt-Winters forecasting algorithm using a frequency corresponding to the most significant cycle length.

Instructions of software described above (including time series processing module 102 and frequency module 104 of FIG. 1) are loaded for execution on a processor (such as one or more CPUs 106 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of forecasting data, comprising:
   receiving an initial collection of data having a first length;
   determining, by a computer, that the first length of the initial collection of data is insufficient for performing forecasting using a forecasting algorithm;
   in response to determining that the first length is insufficient, reversing, by the computer, an order of the initial collection of data to provide a reversed collection of data;
   applying, by the computer, forecasting on the reversed collection of data to estimate additional data values to combine with the initial collection of data to provide a second collection of data having a second length greater than the first length, wherein the second length of the second collection of data is sufficient to perform forecasting using the forecasting algorithm; and
   applying, by the computer, the forecasting algorithm on the second collection of data.

2. The method of claim 1, wherein receiving the initial collection of data comprises receiving an initial time series of data, wherein reversing the order of the initial collection of data comprises reversing a time order of the initial time series of data, and wherein applying the forecasting on the reversed collection of data comprises applying forecasting on the reversed time series of data.

3. The method of claim 2, wherein determining that the first length of the initial time series of data is insufficient for performing forecasting using the forecasting algorithm comprises determining that the first length of the initial time series of data is less than N times a length of a most significant cycle in the initial time series of data, wherein N is a predetermined number associated with the forecasting algorithm.

4. The method of claim 3, further comprising:
in response to determining that the first length of the initial time series of data is insufficient for performing forecasting using the forecasting algorithm, identifying a length of a next most significant cycle of the time series of data; and
comparing the first length of the initial time series of data with N times the length of the next most significant cycle.

5. The method of claim 4, wherein reversing the time order of the initial time series of data and applying forecasting on the reversed time series of data is in response to determining that the first length of the initial time series of data is at least N times the length of the next most significant cycle of the initial time series of data.

6. The method of claim 1, further comprising determining a difference between the first length of the initial collection of data and a length that is sufficient for performing forecasting using the forecasting algorithm.

7. The method of claim 6, further comprising applying the forecasting on the reversed collection of data to estimate a number of the additional data values based on the determined difference.

8. The method of claim 1, wherein the initial collection of data comprises an initial time series of data, and wherein the second collection of data comprises a second time series of data, and wherein applying the forecasting algorithm on the second time series of data comprises applying a Holt-Winters forecasting algorithm on the second time series of data.

9. The method of claim 8, wherein applying the Holt-Winters forecasting algorithm on the second time series of data comprises applying the Holt-Winters forecasting algorithm with a frequency parameter set based on a most significant cycle length of the initial time series of data.

10. The method of claim 9, wherein the reversed collection of data comprises a reversed time series of data, and wherein applying forecasting on the reversed time series of data comprises applying the Holt-Winters forecasting algorithm on the reversed time series of data with a frequency parameter set based on an $i^{th}$ most significant cycle length, wherein i is 2 or greater.

11. The method of claim 10, further comprising determining that a length of the initial time series of data is at least N times the $i^{th}$ most significant cycle length, wherein N is a predetermined number based on the Holt-Winters forecasting algorithm.

12. The method of claim 1, wherein receiving the initial collection of data comprises receiving the initial collection of at least one of sales data, revenue data, profit data, cost data, network performance data, and server performance data.

13. A method of forecasting based on time series data, comprising:
receiving initial time series data having a first length;
determining, by a computer, that the first length of the initial time series data is insufficient for performing forecasting using a forecasting algorithm;
in response to determining that the first length is insufficient, predicting, by the computer, additional data values for time points prior to a beginning of the initial time series data;
combining, by the computer, the predicted additional data values with the initial time series data to form a lengthened time series data, wherein the lengthened time series data has a length that is sufficient to perform forecasting using the forecasting algorithm; and
applying, by the computer, the forecasting algorithm on the lengthened time series data.

14. The method of claim 13, wherein predicting the additional data values comprises performing a reverse forecast.

15. The method of claim 14, wherein performing the reverse forecast comprises reversing the initial time series data and applying the forecasting algorithm on the reversed time series data.

16. The method of claim 15, wherein applying the forecasting algorithm on the reversed time series data uses a first value for a seasonality parameter of the forecasting algorithm, and wherein applying the forecasting algorithm on the lengthened time series data comprises applying the forecasting algorithm with a second value for the seasonality parameter.

17. The method of claim 13, wherein applying the forecasting algorithm on the lengthened time series data comprising applying a Holt-Winters forecasting algorithm on the lengthened time series data.

18. A computer-readable storage medium containing instructions that when executed cause a computer to:
receive an initial collection of data having a first length;
determining that the first length of the initial collection of data is insufficient for performing forecasting using a forecasting algorithm;
in response to determining that the first length is insufficient, reverse an order of the initial collection of data to provide a reversed collection of data;
apply forecasting on the reversed collection of data to estimate additional data values to combine with the initial collection of data to provide a second collection of data having a second length greater than the first length, wherein the second length of the second collection of data is sufficient to perform forecasting using the forecasting algorithm; and
apply the forecasting algorithm on the second collection of data.

19. The computer-readable storage medium of claim 18, wherein the initial collection of data comprises an initial time series of data, wherein the reversed collection of data comprises a reversed time series of data, and wherein the second collection of data comprises a second time series of data.

20. The computer-readable storage medium of claim 19, wherein the forecasting algorithm comprises a triple exponential smoothing algorithm.

* * * * *